US006952725B1

(12) United States Patent
Raghunandan

(10) Patent No.: US 6,952,725 B1
(45) Date of Patent: Oct. 4, 2005

(54) METHOD TO CHECK E-MAIL COUNT AT BOOT TIME IN PERSONAL COMPUTER SYSTEMS

(75) Inventor: Hulikunta Prahlad Raghunandan, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 09/649,738

(22) Filed: Aug. 28, 2000

(51) Int. Cl.$^7$ ............................................. G06F 15/177
(52) U.S. Cl. ...................... 709/220; 709/222; 709/206; 713/1; 713/2
(58) Field of Search ................ 709/220–222, 709/206, 203, 227–229, 223–224; 713/1, 713/2

(56) References Cited

U.S. PATENT DOCUMENTS

| | | | |
|---|---|---|---|
| 5,919,257 A | * | 7/1999 | Trostle ....................... 713/200 |
| 5,978,912 A | * | 11/1999 | Rakavy et al. ............... 709/222 |
| 6,438,688 B1 | * | 8/2002 | Nunn ........................... 709/220 |
| 6,457,879 B1 | * | 10/2002 | Thurlow et al. ............. 709/206 |
| 6,463,530 B1 | * | 10/2002 | Sposato ....................... 709/220 |
| 6,609,151 B1 | * | 8/2003 | Khanna et al. .............. 709/220 |
| 2002/0112008 A1 | * | 8/2002 | Christenson et al. ....... 709/206 |

* cited by examiner

Primary Examiner—Philip B. Tran
(74) Attorney, Agent, or Firm—T. Rao Coca; Anthony V S England

(57) ABSTRACT

This invention relates to a system of checking email count at boot time wherein the BIOS in the computing system includes a means to communicate with the network adapter, a means to access the said remote email server through network during the boot up process using said network adapter, a means to download the email count for the current user from the remote email server on said network, and a means to display the email count for the current user in a defined format on the display of said computing system. The invention also provides a method and computer program product in respect of the above system.

9 Claims, 2 Drawing Sheets

METHOD TO CHECK E-MAIL COUNT AT BOOT TIME IN PERSONAL COMPUTER SYSTEMS

FIELD OF THE INVENTION

This invention relates to a method to check email count at boot time in personal computer systems.

BACKGROUND OF THE INVENTION

When a personal computer is switched on, the BIOS, which is a program stored in an erasable programmable read only memory (EPROM) in the hardware of the system, carries out a sequence of operations
- it determines the system configuration,
- it verifies some of the hardware
- it then loads the OS loader from the storage device (eg. Hard disk)

Thereafter the OS loader takes over and continues with the loading of the operating system including the OS kernel and resident OS subsystems.

Only after all these basic activities have been completed, the system is ready to perform useful tasks. This entire process takes a significant amount of time.

For a user interested in knowing the received email count this implies a significant amount of time spent in waiting for the system to actually perform the required task, from the time he/she switches it on.

Many users, especially those traveling frequently, need to keep in constant touch with their incoming mail. This requires frequent accessing of the email system. As each time the system has to be turned on, the waiting time to get email information becomes significant.

THE OBJECTS AND SUMMARY OF THE INVENTION

The object of this invention is to avoid the above drawback and save time.

To achieve the said objective this invention provides in a computing system consisting of a processor, memory storage, input and output devices, a network interface adapter and a basic input/output system (BIOS) for booting, said system being connected to a remote email server, characterized in that said BIOS includes:
- a means to communicate with the network adapter,
- a means to access the said remote email server through network during the boot up process using said network adapter,
- a means to download the email count for the current user from the remote email server on said network, and
- a means to display the email count for the current user in a defined format on the display of said computing system.

The communication with said remote email server is through TCP/IP protocol.

The above system further comprises configuration means for configuring the designated users of the system during a previous system operation.

This invention also provides in a computing system including a network adapter and a basic input/output system (BIOS) connected to a remote email server through a network, a method for accessing email count during the boot up process comprising:
- communicating with the network adapter,
- accessing the network during the boot up using said network adapter,
- downloading the email count for the user from the remote email server on said network, and
- displaying the email count for the current user in a defined format on the display of said computing system.

The communication with said remote email server is through TCP/IP protocol

The above method further comprises configuring the designated users of the system during a previous operation.

This invention also provides a computer program product comprising computer readable program code stored on computer readable storage medium embodied therein for causing a computer to access email count during the boot up process, said computer program code comprising:
- computer readable program code means configured for communicating with the network adapter,
- computer readable program code means configured for accessing said remote email server through network during the boot up process using said network adapter,
- computer readable program code means configured for downloading the email count for the current user from the remote email server on said network, and
- computer readable program code means configured for displaying the email count for the current user in a defined format of the display of said computing system.

The said computer readable program code means is configured for communicating with the network adapter through the TCP/IP protocol.

The said computer readable program code means further comprises computer readable program code means for configuring the designated users of the system during a previous system operation.

BRIEF DESCRIPTION OF THE DRAWINGS

The invention will now be described with reference to the accompanying drawings.

DETAILED DESCRIPTION OF THE DRAWINGS

Figure 1:
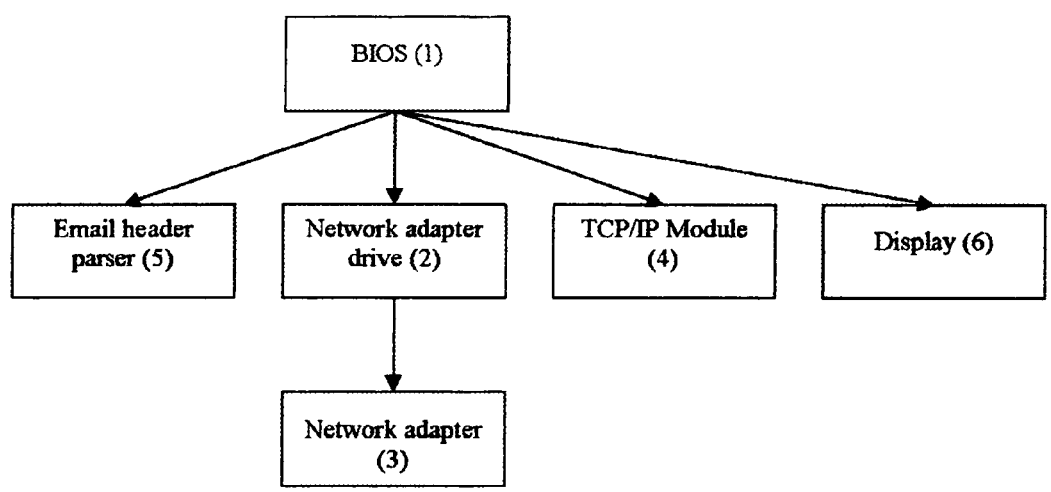
FIG. 1 shows the entity diagram of the system, according to this invention

As shown in FIG. 1, the BIOS (1) stored in the erasable programmable read only memory (EPROM) contains network adapter driver (2), which contains the operating routines for network adapter (3). BIOS (1) also includes TCP/IP module (4) and email header parser (5) and display routine (6).

Figure 2:
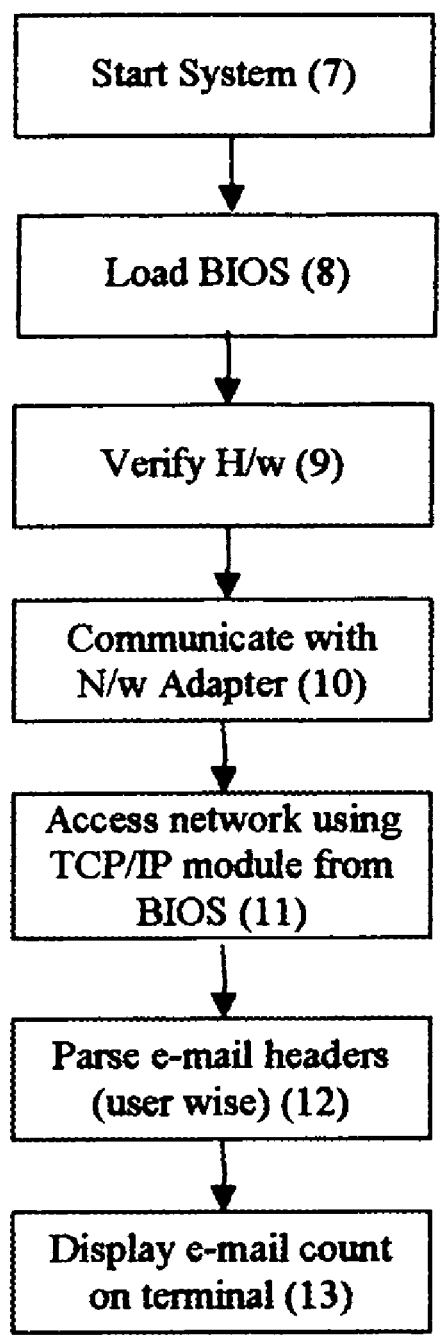
FIG. 2 shows the system activity flow chart, according to this invention.

Referring to FIG. 2, when the computing system is switched on (7), the BIOS is loaded (8) and starts execution. As a first step, the BIOS verifies the hardware of the system (9). If the verification is successful, the BIOS uses network adapter driver (2) to communicate (10) with the network adapter hardware (3). The BIOS further uses the TCP/IP module (4) to communicate (11) with the remote email system over the network and access the email headers. The received email headers are then parsed (12) by email header parser (5) to extract the email count for each designated user. This information is then displayed (13) on the terminal of the system.

Advantages:

1. This invention saves precious time to the ordinary user, who wants to check e-mail count before deciding/planning actions for a particular day. The user does not have to wait for the application software and OS software to be loaded and initialised.

2. With more and more functionality being introduced into the BIOS software, this invention may pave the way for low cost e-mail count devices which substitute for a personal computer system.

3. In B2C scenarios this invention would be helpful in advance planning.

4. This invention can be extended to other large computer systems and similar benefits derived there from.

What is claimed is:

1. A computing system comprising:
   a processor;
   memory storage;
   input and output devices;
   a network interface adapter for connecting the computing system to a remote email server via a network; and
   a basic input/output system (BIOS) for booting the computing system, wherein the BIOS includes:
      communicating means for communicating with the network adapter, wherein the communicating means accesses the remote email server through the network during the booting of the computer system using said network adapter, and downloads, during the booting of the computing system, email headers from the remote email server on said network;
   means for parsing the email headers during the booting of the computing system to extract an email count for a user; and
   a means to display the email count during the booting of the computer system for the user in a defined format.

2. A system as claimed in claim 1 wherein the communication with said remote email server is through TCP/IP protocol.

3. A system as claimed in claim 1 further comprising configuration means for configuring of the system during a certain operation prior to the booting of the computing system.

4. In a computing system including a display, a network adapter and basic input/output system (BIOS) connected to a remote email server through a network, a method for accessing email count during booting of the computer system, the method comprising:
   booting the computing system by the BIOS;
   communicating with the network adapter, wherein the communicating includes accessing the network during the booting of the computer system, by the BIOS using said network adapter, and downloading, by the BIOS during the booting of the computer system, email headers from the remote email server on said network;
   parsing the email headers by the BIOS during the booting of the computer system to extract an email count for a user; and
   displaying, by the BIOS during the booting of the computer system, the email count for the user in a defined format on the display of said computing system.

5. A method as claimed in claim 4 wherein the communication with said remote email server is through TCP/IP protocol.

6. A method as claimed in claim 4 further comprising configuring users of the system during a certain operation prior to the booting of the computing system.

7. A computer program product comprising computer readable program code stored on computer readable storage medium embodied therein for causing a computing system to access an email count during booting of the computing system, said computer program code comprising:
   basic input/output system (BIOS) computer readable program code means configured for performing booting the computing system wherein the BIOS computer readable program code means includes:
   computer readable program code means configured for communicating with a network adapter, wherein the communicating includes accessing a remote email server through a network during the booting of the computing system using said network adapter, and downloading, during the booting of the computing system, email headers from the remote email server on said network;
   computer readable program code means configured for parsing the email headers during the booting of the computing system to extract email count for a user; and
   computer readable program code means configured for displaying, during the booting of the computing system, the email count for the user in a defined format on a display of said computing system.

8. A computer program product as claimed in claim 7 wherein said computer readable program code means is configured for communicating with the network adapter through a TCP/IP protocol.

9. A computer program product as claimed in claim 1 further comprising computer readable program code means for configuring users of the system during a certain operation prior to the booting of the computing system.

* * * * *

UNITED STATES PATENT AND TRADEMARK OFFICE
CERTIFICATE OF CORRECTION

PATENT NO. : 6,952,725 B1
DATED : October 4, 2005
INVENTOR(S) : Hulikunta Prahlad Raghunandan It is certified that error appears in the above-identified patent and that said Letters Patent is hereby corrected as shown below:

Column 3,
Line 40, "configuring of the system" should read -- configuring users of the system --.
Line 44, "and basic input/output" should read -- and a basic input/output --.

Signed and Sealed this

Twentieth Day of December, 2005

JON W. DUDAS
*Director of the United States Patent and Trademark Office*